P. PESTALOZZA.
POINT CHANGING MECHANISM.
APPLICATION FILED OCT. 30, 1912.

1,121,200. Patented Dec. 15, 1914.

Witnesses
Herman Jakobson
Alys Scott

Inventor,
Paolo Pestalozza
By Knight Bros
Attorneys.

UNITED STATES PATENT OFFICE.

PAOLO PESTALOZZA, OF TURIN, ITALY.

POINT-CHANGING MECHANISM.

1,121,200. Specification of Letters Patent. Patented Dec. 15, 1914.

Application filed October 30, 1912. Serial No. 728,687.

*To all whom it may concern:*

Be it known that I, PAOLO PESTALOZZA, a subject of the King of Italy, residing at 40 Corso Arbassano, Turin, Italy, have invented certain new and useful Improvements in Point-Changing Mechanism, of which the following is a specification.

This invention relates to point changing mechanism for railways and particularly to the type actuated from a vehicle on the track, as described in my Letters Patent 1,075,851, dated October 14, 1913.

The present invention has for object certain improvements in the said mechanism.

The main feature of the present improvements consists therein, that the star wheel for actuating the bolt which accomplishes the actual shifting of the points, has three teeth whereby the said shifting bolt is under effective control during the whole or nearly the whole of its travel, and that the bolt is provided with auxiliary shoulders coöperating with an auxiliary three tooth wheel fixed to the star wheel, the said auxiliary shoulders also preventing undesirable backward turning of the wheel.

Another feature of the present invention consists in the provision of mechanical or electrical means for effecting, externally to the vehicle, the preparatory operation, or release of the indirect control means.

Figure 1:
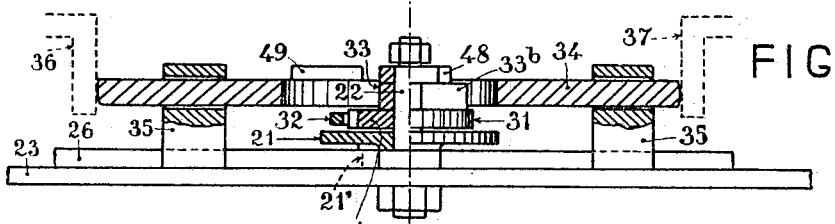
Figure 2:
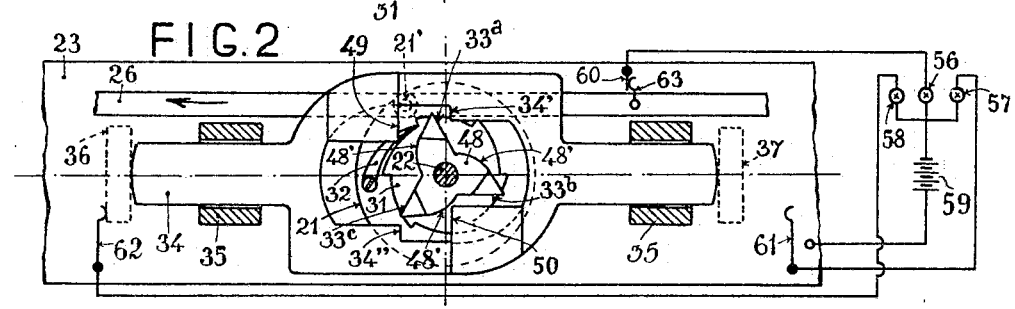
Figure 3:
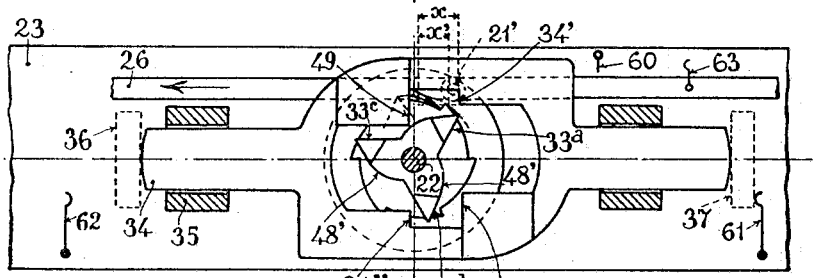
Figure 4:
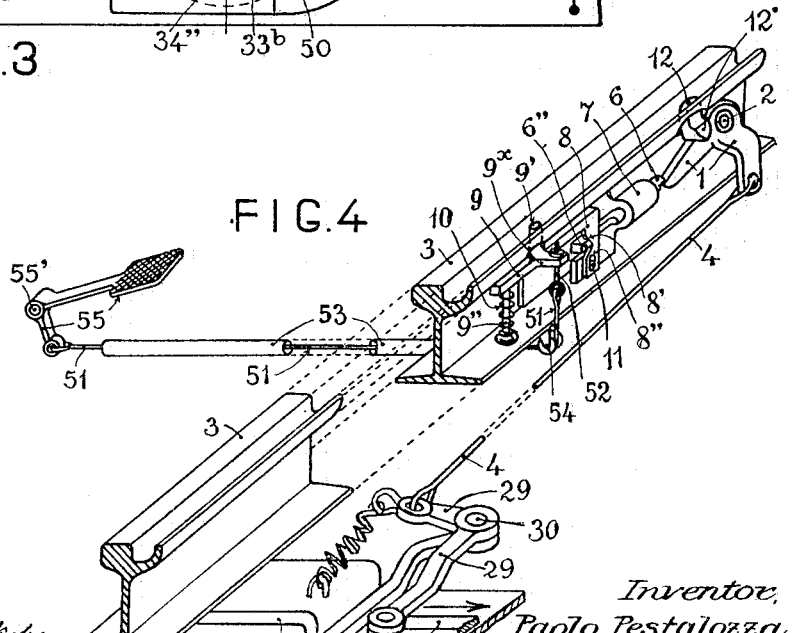

The improved point mechanism according to this invention is illustrated diagrammatically and by way of example in the accompanying drawing, in which:

Figure 1 is an elevation partly in section; Fig. 2 a plan view of Fig. 1; Fig. 3 a similar view to Fig. 2 with the parts in different position, for working the actuating wheel of the bolt which effects the shifting of the points. Fig. 4 is a perspective view of the controlling means for shifting the points.

In the practical construction of the point control mechanism referred to in my patent referred to above, there is adapted in particular a wheel of four or two teeth corresponding to wheel 33 in the present case, for the actuation of the bolt 34 which serves to directly operate the shifting of the points. Such a wheel gives an effective actuation of the bolts during one half only of the stroke.

In the improvements according to the present invention there is used a wheel having three teeth, which has the advantage over the previous wheel with four teeth, of allowing the effective actuation of the bolt which shifts the points during even the entire stroke if desired. This is of great advantage, particularly when the points are very long and consequently very heavy. In the present example the wheel 33 has thus three teeth 33$^a$, 33$^b$, 33$^c$, adapted to alternately act upon the shoulders 34′, 34″ on the bolt 34.

In Figs. 1 to 3 on the drawing, 26 represents the draw rod which is adapted to slide on the foundation plate 23, the latter being provided with guides 35 for the sliding bolt 34 abutting at each end against stops 36 and 37, rigidly connected with the two switch points.

The draw rod 26 which tends to move, under the action of a spring not represented on the drawing, toward the left of the drawing, is normally held in its position shown in Fig. 3 by the arresting device, hereinafter described. The said draw rod 26, as illustrated in Fig. 4, is articulated to one arm of a bell crank lever 29 fulcrumed at 30 to an arm connected to the foundation plate 23. The other arm of the bell crank lever 29 is connected through a draw rod 4 to the vertical arm of a second bell crank lever 1 fulcrumed on the shank of a bolt 2 fixed in the web of one of the rails 3 of the track. The other or horizontal arm of the lever 1, which tends to raise under the pull exerted on the draw rod 4 by the spring acting on the draw rod 26, is stopped in its normal position (Fig. 4) by a spring pawl 6 which is slidably mounted in a fixed housing 7. The other end of the pawl 6 carries a rod 6″ which is beveled and abuts against an oblique face 8′ of vertical projection 8 provided on a cross piece 9. This cross piece has, at the center, a peg or projection 9′ which passes through a suitable hole in the rail 3 and slightly projects above the bottom of the groove in the rail. At the other end, the cross piece 9 abuts against a spring 10 mounted on a guide rod 9″. This arrangement together with a guiding bolt 11, engaging in a slot 8″ in the projection 8, insures the regular lowering of the cross piece 9 when a pressure is exerted on the peg 9′. On the horizontal arm of the bell crank lever 1 and near its fulcrum there abuts a pin 12 passing freely through a hole in the rail 3 and prevented from escaping by means of a lateral projection 12' on the pin; the pin 12 also projecting slightly above the bottom of the rail groove.

Midway between the guides 35 on the foundation plate is seated a stud 22, on which the plate 21 is loosely mounted and connected by means of its pin 21' to the draw rod 26. The plate 21 is provided with a spring pawl 32 which engages with a ratchet wheel 31 also loosely mounted on the pin 22 but rigidly connected to a star wheel 33 both situated above the plate 21. The star wheel has three pointed teeth $33^a$, $33^b$ and $33^c$ adapted to act alternately on the shoulders 34' and 34'' of the sliding bolt 34. An auxiliary wheel 48 is also mounted on the stud 22 to partake in the turning of the star wheel 33 and is provided with three stud teeth having rounded flanks 48' adapted to intermittantly engage with a pair of shoulders 49 and 50 on the sliding bolt 34.

The operation of the mechanism is as follows: When the vehicle arrives near the pin 9' (Fig. 4) this pin and consequently the cross bar 9 are lowered. The lowering of the said bar 9 may be effected as described in my prior Patent No. 1,075,851 by way of a roller situated on the vehicle and lowered by the driver by means of a pedal on the platform of the vehicle. During the lowering of the cross bar 9 the oblique face 8' of projection 8 by acting on the pin 6'', induces the retraction of the pawl 6, thus releasing the end of the bell crank lever 1. The horizontal arm of this lever, under the pull exerted on the draw rod 4, is forced up and raises the pin 12, while the bell crank lever 29 oscillates around its fulcrum 30. Simultaneously the rod 26, the plate 21 and the pawl 32 are brought back to the position of Fig. 2 ready to act on the wheels 31, 33. As the flange of one wheel of the vehicle encounters the pin 12, it forces the same down again, simultaneously lowering the lever 1 which is brought back to the position of Fig. 4 in engagement with the pawl 6. During the lowering of the lever 1 the pull exerted on the rod 4 and transmitted through the bell crank lever 29 to the draw rod 26 jointed at 21' to the plate 21 produces a rotation of the wheel 33 through 1/6 of a turn by means of the pawl and ratchet mechanism 31, 32 and the parts are shifted from the position of Fig. 2 to that of Fig. 3, the tooth $33^a$ comes against the shoulder 34' of the bolt 34 and moves this latter and along with it the switch points by means of stops 36, 37 from left to right. On the subsequent rotation of the wheel 33 in the same direction and to the same extent, the tooth $33^b$ acts upon the shoulder 34'' and moves the bolt 34 and the points in the reverse direction, and so on. If the bolt 34, for instance by hand operation of the points is shifted from the position shown in Fig. 2 to that in Fig. 3, the auxiliary shoulder 49 acting during a certain part of the travel of the bolt 34 upon one of the teeth of the auxiliary wheel 48 produces the rotation of the wheels 48, 33, 31 as if the mechanism had been actuated by the weight of the vehicle, that is to say the displacement of these wheels from the position in Fig. 2 to that in Fig. 3 is realized. If on the other hand the bolt 34, for instance by hand operation of the points, is shifted from the position of Fig. 3 to that of Fig. 2 the shoulder 50 acts on one of the teeth of wheel 48 to produce the same required rotation of the wheel 33. Whatever the displacement of the bolt 34 may be, the wheel 33 is always turned and any disturbance is obviated.

It should be observed that one or the other of the auxiliary shoulders 49, 50 toward the end of the travel of the bolt, always bears against the flanks 48' of one of the teeth of wheel 48, thereby preventing undesired backward rotation of the wheels 33, 48.

It should be noted, that the arrangement of the auxiliary wheel 48 and auxiliary shoulders 49, 50, is necessary in the case of the three-toothed wheel 33, to obviate any disturbance in the position of the said wheel 33 in respect to the reciprocal position of the shoulders 34', 34'', if the bolt 34 should be shifted independently from the action of the weight of the vehicle. In fact if this auxiliary device 48, 49, 50 was not employed, by displacing the bolt 34 from the position in Fig. 2 to that in Fig. 3 independently from the action of the weight of the vehicle, the wheel 33 would remain in the position of Fig. 2; consequently, by rotation of the said wheel under the action of the weight of the vehicle it would not act on the shoulders 34' or 34'' for the purpose of displacing the bolt 34. These conditions take place only with the three-toothed wheels while in the case of wheels with four or two teeth as described in my patent above referred to, owing to the fact that the teeth are diametrically opposed, their position relatively to the shoulders 34', 34'' of the bolt 34 will always be convenient to produce the displacement of the bolt.

In relation to the above described operation the following facts should be observed: In the first place the three tooth wheel allows the bolt 34 to be effectively actuated during a portion $x'$ of its stroke, see Fig. 3, equal to or slightly less than the total stroke $x$. The value of $x'$ depends only on the size of the teeth $33^a$, $33^b$ and $33^c$ and of the shoulders 34' 34'' on the bolt, which dimensions are not subject to any limiting conditions as in the case of four or two toothed wheels. This feature is of the greatest importance particularly in the actuation of very heavy points. Further in the case of the three tooth wheel the rotation which it has to perform at each actuation to obtain the operation of the bolt 34, is equal to half the angular distance between two successive teeth, that is 60°; this requires that the ratchet wheels 31 and 40, and their pawls 32, 39, operate through 60° at each rotation of the wheel 33 and allows the effective stroke of the draw rod 26 to be reduced, other conditions being the same as when a four or two toothed wheel is used.

The improvements relating to the method of control consist essentially in the following: In my patent referred to above was considered only the case in which the preparatory actuation corresponding to the release of the bell crank lever is effected by action of the driver on one of the pedals on the platform of the vehicle. The result of this action is to lower the pin 9' of the cross bar 9 (see Fig. 4) and consequently to prepare the whole of the mechanism for the second stage of operation in which the actual shifting of the points takes place by the action of the weight of the vehicle. Now in certain practical cases it is desirable to perform the said preparatory operation from outside the vehicle and independently of the driver of this latter. This can be effected by means of any device allowing the cross bar 9 to be lowered at will from outside. An example of such device is shown in Fig. 4, in which a metal cable 51 is secured by means of a pin 52 to an arm 9× of the cross bar 9 this pin being capable of sliding in a hole in 9× for the purpose of allowing, if desired, the bar 9 to be lowered by the action of mechanism mounted on the vehicle, without shifting the cable. The cable 51 after passing over guide pulleys 54 is led through a protective pipe 53 and is secured at its other end to one of the arms of a bell crank lever 55 situated at any place outside of the track and fulcrumed at 55'. It is evident that by lowering the free end of the lever 55 the cable 51 is tensioned and the cross bar 9 lowered the effect of which is to release the indirect actuating device. The same object may also be accomplished by any other mechanical arrangement, or by electrical means for example an electromagnet acting so as to pull down the cross bar 9.

The external operation of the indirect point control means is particularly advantageous in groups of points, and in this case the levers 55 or other control members can be arranged inside a sort of block cabin. This external control is possible in the construction of the mechanism according to the present invention since the preparatory operation of the releasing of the indirect device requires only a small force; the actual shifting of the points is always effected by the weight of the vehicle.

I claim:

1. In point changing mechanism for railways wherein the shifting of the points is actuated selectively by the car wheels or manually, the combination with an actuating rod, and gearing for rotating a star wheel in one direction, said gearing being actuated by said rod, and a sliding bolt connected with the switch points; of a star wheel having three teeth, shoulders on the sliding bolt, diametrically disposed relative to the star wheel and constructed to have intermittent engagement with said teeth for reciprocating the sliding bolt, a second set of three teeth on said star wheel and a second pair of shoulders on said sliding bolt, said shoulders being adapted to engage intermittently with said last mentioned teeth for rotating said star wheel, when said switch points are manually operated.

2. In point changing mechanism for railways wherein the shifting of the points is actuated by the car wheels or by hand, the combination with an actuating rod and gearing for rotating a star wheel in one direction, said gearing actuated by said rod, and a sliding bolt connected with the switch points; of a star wheel having three teeth, shoulders on the sliding bolt, diametrically disposed relative to the star wheel and constructed to have intermittent engagement with said teeth for reciprocating the sliding rod, a second set of three teeth on said star wheel and a second pair of shoulders on said sliding bolt said shoulders being adapted to engage intermittently with said last mentioned teeth for rotating said star wheel, when said switch points are manually operated; car actuated means for operating said actuating rod and means for arresting said car actuated means, and link and bell crank device for manually releasing said arresting means.

3. In point changing mechanism for railways wherein the shifting of the points is actuated by the car wheels or manually, the combination with an actuating rod and gearing for rotating a star wheel in one direction, said gearing being actuated by said rod, and a sliding bolt connected with the switch points; of a star wheel having three teeth, shoulders on the sliding bolt, diametrically disposed relative to the star wheel and constructed to have intermittent engagement with said teeth for reciprocating the sliding rod, a second set of three teeth on said star wheel and a second pair of shoulders on said sliding bolt, said shoulders being adapted to engage intermittently with said last mentioned teeth for rotating said star wheel, when said switch points are manually being operated; car actuated means for operating said actuating rod and means for arresting said car actuated means and link and crank device for manually releasing said arresting means, said link and bell crank device being mounted adjacent the switch points and operable independent of the car.

The foregoing specification signed at Turin, Italy, this 7th day of September, 1912.

PAOLO PESTALOZZA.

In presence of two witnesses—
JOCELYN C. LOUBEYRAN,
FRANCESCO LEMAN.